United States Patent Office 3,194,855
Patented July 13, 1965

3,194,855
METHOD OF VIBRATORILY EXTRUDING GRAPHITE
James Byron Jones and William B. Tarpley, Jr., West Chester, Pa., assignors to Aeroprojects Incorporated, West Chester, Pa., a corporation of Pennsylvania
No Drawing. Filed Oct. 2, 1961, Ser. No. 141,989
3 Claims. (Cl. 264—70)

This invention relates to extrusion, and more particularly to graphite extrusions, and to a method for making graphite extrusions.

Graphite is usually made from a "green" mixture. This "green" mixture is first extruded into the requisite shape, such as a rod, pipe, or the like, and then carbonized and finally graphitized.

The most common "green" mixtures in commercial use today comprise mixtures of either coke, carbon black, and pitch or mixtures of graphite flour, carbon black, and a furfuryl alcohol condensate resin. In the former "green" mixture, the pitch constitutes the binder and lubricant, whereas in the latter "green" mixture the furfuryl alcohol condensate resin constitutes the binder and lubricant. In addition, additional binders and lubricants have been suggested. For example, in United States Letters Patent 2,870,031, erucic acid was added as a lubricant to a "green" mixture of coal tar pitch, petroleum coke, and carbon black in a benzene base.

We have determined that for high quality graphite, it is most desirable to restrict to the maximum feasible extent the amount of binder and lubricant. Thus, we have determined that the volatilization of the binder and lubricant is at least partially responsible for the voids and cracks currently obtained in extruded graphite.

We have determined "green" compositions which yield superior quality graphites.

We have developed a method for producing high quality extruded graphite utilizing relatively low extrusion pressures.

This invention has an an object a novel extrusion method for extruding "green" graphite mixtures.

This invention has an another object the provision of a method which yields superior extruded graphite.

This invention has as still another object the provision of a method in which relatively low extrusion pressures are utilized to extrude "green" graphite mixtures.

This invention has an another object the provision of a novel "green" graphite mixture.

This invention has a still further object the provision of a novel article of manufacture, namely an extruded article of graphite substantially devoid of cracks and voids.

Other objects will appear hereinafter.

In the process of the present invention, the green graphite extrusion mix is extruded while virbatory energy having a frequency of 30 to 300,000 cycles per second is applied through the surface of the material being extruded to the material. The apparatus which may be used in the process of the present invention is that disclosed in copending United States patent application Serial No. 114,836 filed June 5, 1961, in the name of James Byron Jones for Ultrasonic Extrusion Apparatus. The disclosure of patent application Serial No. 114,836 is incorporated herein by reference.

We have found that any of the normal modes of vibratory energy may be utilized in the process of our invention, such as longitudinal, flexural, torsional and radial vibratory energy.

The power level of the vibratory energy must be sufficient to effect a reduction in the requisite amount of pressure needed to extrude the extrusion mixture and/or increase the rate of extrusion.

We have found that when the process of our invention is utilized a lower amount of binder and lubricant may be employed in the "green" graphite extrusion mix. Further, we have found that when the extruded graphite extrusion mix is carbonized and then graphitized, the resultant extruded graphite may achieve a quality not heretofore obtained with even the highest quality extruded graphite articles.

Artificial graphite can be manufactured from almost any organic material that leaves a high carbon residue on heating. The process of the subject invention in which vibratory energy is applied into the material through its surface during its extrusion is applicable to the formation of all artificial graphites. However, it has its prime utility in connection with high quality graphites, such as are formed from petroleum coke.

A typical raw petroleum coke used in the present invention is prepared by the polymerization and distillation of volatiles from a heavy refinery oil, at a temperature of approximately 450° C. Prior to calcining, the petroleum coke will generally have from 7 to 16 weight percent of volatile matter at 1000° C. and normally of the order of about 11 weight percent; about 0.1 to 2.2 weight percent of ash, and normally of the order of about 0.7 weight percent; and from about 0.1 to 4.3 weight percent of sulfur, and normally of the order of about 1.5 weight percent. The coke as received from the refinery is fired or calcined to a temperature of about 1300° C. It is the calcined coke that is normally used in the green extrusion mixtures of the present invention.

The calcined coke is crushed and screened to form particles which may range in size from 0.4 mm. to 13 mm. These particles are blended with graphite flour, which may have a particle size range of the order of about 2 microns up to about 300 microns.

The ratios of the blend will vary depending on the ultimate use of the graphite as will be readily understood by one having skill in the art of blending "green" graphite extrusion mixes.

The coke blend is mixed with coal tar pitch. Such coal tar pitch is a residue of coal tar distillation, and generally will comprise about 91.3 to 92.9 weight percent of carbon; 4.47 to 4.80 weight percent of hydrogen; 0.81 to 1.07 weight percent of nitrogen; 0.42 to 0.53 weight percent of sulfur; 0.03 to 0.10 weight percent of ash; and oxygen determined by difference of 1.16 to 2.28 weight percent. Suitable pitches will normally have a melting point of about 100° C., be about 30 weight percent insoluble in benzene; 9 to 16 weight percent insoluble in quinoline; have a density of 1.31 grams per cc. at 25° C. and a coking value of about 65 percent (determined as the proportion of the pitch that is left as binder carbon after heating to 1000° C.). The viscosity of pitches changes rapidly with temperature. A typical binder pitch may have the viscosity of 13,000 centipoises at 130° C., 2,200 centipoises at 150° C., and 540 centipoises at 170° C.

Carbon black may be added to the extrusion mix, as will be evident to one having skill in the art, as a supplement to or a replacement for a portion of the coke.

In "green" graphite extrusion mixes derived from coke (with or without carbon black), the weight percentage of the pitch is normally maintained at a level of about 20 weight percent in order to achieve satisfactory extrusion. Furthermore, approximately about 2 weight percent of a lubricant, such as petrolatum or erucic acid may be added to the mixture. In addition, the mixture may include a liquid base, such as benzene, and may also contain minor amounts of oil.

We have found that with "green" graphite extrusion mixes of this type, it is not necessary to employ the lubricant, such as the petrolatum or erucic acid and that the pitch level may be reduced appreciably below 20 weight percent, such as to a level of 10 to 15 weight percent, and preferably of an order of about 12 weight percent. We have found that these mixtures extrude satisfactorily at lower pressures and/or higher extrusion rates provided that vibratory energy having a frequency of 30 to 300,000 cycles per second is applied into the material being extruded through its surface during the extrusion, as by the use of the apparatus disclosed in aforementioned Serial No. 114,836.

We have further found that the resultant graphite article after the extruded mixture has been carbonized and graphitized has superior physical properties to prior graphite articles. Thus, its density is greater and it is relatively free, if not entirely free, from surface and subsurface cracks and voids.

In addition to mixtures of petroleum coke (with or without carbon black) and pitch, which mixtures are used to form the highest quality graphite articles, such as high temperature refractory material, and containers for molten metals, etc. the subject invention is applicable to other "green" graphite extrusion mixes.

An example of another green graphite extrusion mixture comprises mixtures of graphite flour, carbon black, and binder lubricants. This invention is applicable to such mixtures, and the subject process may result in the entire elimination of the binder lubricant or in a reduction of the amount of the binder lubricant needed to achieve extrusion. For example, whereas with mixtures of approximately 65 to 73 weight percent of graphite flour; and 7 to 15 weight percent of amorphous carbon black, about 20 to 25 weight percent of a binder lubricant of the type comprising the furfuryl alcohol condensate described in United States Patent 2,681,896 is normally needed, when the process of the present invention is utilized in connection with a green graphite extrusion mixture of graphite flour and carbon black, the weight percentage of the binder lubricant may be drastically reduced. Thus, when vibratory energy having a frequency of 30 to 300,000 cycles per second is applied during extrusion utilizing the apparatus of Serial No. 114,836 superior extrusions are obtained with a composition consisting of 82 weight percent of graphite flour, 9 weight percent of carbon black, and 9 weight percent of the furfuryl alcohol condensate resin of Patent 2,681,896.

The invention of the present invention includes the process of the present invention in which vibratory energy is applied during extrusion as has heretofore been explained. Subsequent to the extrusion of the "green" graphite extrusion mixture, the carbonization and graphitization is achieved by conventional procedures. For example, with "green" graphite extrusion mixtures of coke (with or without carbon black) and pitch, the carbonization may be achieved by the use of a gas-fired furnace and a minimum temperature of about 750° C.

The present invention contemplates both the conventional processes of directly graphitizing the gas-fired carbon bars or first pitch impregnating the gas-fired bars as by the technique of preheating such bars to a temperature of about 250° C. and evacuating them to less than one-tenth of an atmosphere, and then immersing the evacuated bars in hot pitch, followed by the use of a pressure of 100 pounds per square inch to assure impregnation, followed by graphitization in an electrical furnace or the like at temperatures which may reach of the order of 2,600 to 3,000° C. Alternatively, the graphitization may be achieved by a gas-firing cycle subsequent to the pitch impregnation, followed by a graphitization in which the bars are subjected to the action of a purifying gas and heated electrically to a temperature of approximately 2,500° C.

The invention will be illustrated by the following specific examples, but it is not limited thereto. A wide variety of "green" graphite extrusion mixes may be processed according to the process of the present invention, including those containing new materials or materials which are newly made commercially available. It is therefore not only impossible to attempt a comprehensive catalog of useful components, but to attempt to apprehend or describe the invention in its broader aspects in terms of the chemical names of all of the possible components used would be misleading. To formulate a set of specifications, or a composition in the light of the present disclosure will call for chemical knowledge and skill, and skill in the art of preparing graphite, but the office of chemist or graphite technician will be like that of a mechanical engineer who prescribes in the construction of a machine the proper materials and proper dimensions therefor. From this knowledge as a chemist of the materials available he will know or deduce with confidence their applicability to the purposes of the invention, or, otherwise, and in the case of novel materials, routine tests not of an inventive nature will provide reliable data. Similarly, the application of the vibratory energy in the light of the disclosure of the present invention and the disclosure of Serial No. 114,836 will fall within the skill of one having ordinary skill in the art. We may safely assume that no one will wish to make a useless mixture or effect a useless process, or will be misled because it is possible to misapply the teachings of the present disclosure in order to do so.

*Example I*

A green graphite extrusion mixture of 56 weight percent of coke, 32 weight percent of carbon black, and 12 weight percent of pitch was extruded at a temperature of between 175° F. to 185° F. through the extrusion apparatus disclosed in Serial No. 114,836.

When no vibratory energy was applied to the apparatus, at the extrusion pressure of 5,475 pounds per square inch a rate of extrusion of 63 inches per minute was achieved.

Using the identical size die opening, and the identical load, and applying 1,250 watts of input to the magnetostrictive transducers of the ultrasonic system at a frequency of 20,000 cycles per second, the pressure dropped to the order of 5000 pounds per square inch, and the rate of extrusion increased to 145 inches per minute.

Extrusions obtained both from the run in which no ultrasonic vibratory energy was applied and the run in which ultrasonic vibratory energy was applied, were carbonized at 2000° F. in an atmosphere of argon, and allowed to cool under argon. The two samples were subsequently examined at a magnification of 27 times, and the following differences were noted:

In the sample derived from the extrusion in which no vibratory energy had been applied the outer surface was rough, and pitted with many craters. There were short transverse cracks, and many longitudinal cracks. The longitudinal cracks extended not only throughout the surface, but almost for the full length of the piece. By rotation under the microscope, it could be determined that these cracks appeared to be radially serpentine, and perhaps as wide as two or more average size platelets of which the piece was composed.

The article which had been processed in accordance with the present invention had a smooth outer surface with virtually no pits nor craters. No transverse cracks were noted, nor were there any longitudinally cracks.

*Example II*

A "green" graphite extrusion mixture consisting of 59 weight percent of coke, 32 weight percent of carbon black, and 9 weight percent of pitch was extruded through the apparatus of Serial No. 114,836.

When no vibratory energy was applied to the apparatus at the extrusion pressure of 10,000 pounds per square inch, no extrusion could be achieved.

When vibratory energy was applied to the apparatus having a frequency of 20,000 cycles per second with an input of 1000 watts to the magnetostrictive transducers, extrusion was achieved at the rate of 14.6 inches per minute.

Graphitization of the extruded material pursuant to the process of Example I produced a sample conforming to the quality of the sample of the present invention produced in Example I.

*Example III*

A "green" graphite extrusion mixture of 82 weight percent graphite flour, 9 weight percent of carbon black, and 9 weight percent of furfuryl alcohol was extruded through the apparatus of Serial No. 114,836 under a 12 tons extrusion load equivalent to a pressure of 2,500 pounds per square inch. With a 3½ inch ram diameter a solid rod having an outside diameter of 9/10 of an inch was extruded.

Without the application of vibratory energy, a 12 inch length required 55.2 seconds.

With the application of ultrasonic vibratory energy having a frequency of 20,000 cycles per second and an input to the magnetostrictive transducers of 1,800 watts, a 12 inch length was extruded in 6.4 seconds.

Graphitization and subsequent microscopic comparison pursuant to the technique employed in Example I revealed that the material which had been processed without the application of vibratory energy was of the same inferior quality of the material which had been processed without the application of vibratory energy in Example I. The material which had been processed with the application of vibratory energy possessed the same properties as the material processed with vibratory energy pursuant to Example I.

*Example IV*

The preceding example was repeated except that the extrusion load was raised from 2,500 pounds per square inch to 3,100 pounds per square inch. The extrusion rate without the application of vibratory energy was 42.5 inches per minute, and the extrusion rate with the application of vibratory energy (20,000 cycles per second and an input to the magnetostrictive transducers of 1,800 watts) was 85.5 inches per minute.

*Example V*

A "green" graphite extrusion mixture of 84 weight percent graphite flour, 10 weight percent of carbon black, and 6 weight percent of the furfuryl alcohol condensate resin of Patent 2,681,896 was extruded through the apparatus of Serial No. 114,836 using a die which formed a pipe having a 1.380 inch outside diameter and a 0.9 inch inside diameter.

At an extrusion pressure on the mixture of 2,700 pounds per square inch, without the application of vibratory energy, an extrusion rate of 2.52 inches per minute was obtained.

With the application of vibratory energy of 20,000 cycles per second and an input to the magnetostrictive transducers of 2000 watts, an extrusion rate of 12.0 inches per minute was obtained.

The procedure of Example I was used to graphitize the extruded pipe from this example. The pipe which had been extruded without the application of ultrasonic vibratory energy had the properties on both its interior and exterior surfaces similar to the material which had not been exposed to vibratory energy in Example I, whereas the pipe prepared pursuant to the process of the present invention was virtually without flaws.

Microscopic determinations were made with the controls and products from the preceding examples at various power levels in order to determine the presence of layering. Without exception, all of the controls exhibited a certain degree of layering, particularly near the outside surface. At similar magnifications, no such layering was noted in respect to the material processed pursuant to the present invention, or if any layering were noted, it was minimal.

The present invention may be embodied in other specific forms without departing from the spirit or essential attributes thereof and, accordingly, reference should be made to the appended claims, rather than to the foregoing specification as indicating the scope of the invention.

We claim:

1. A process for extruding a green graphite extrusion mixture containing a binder lubricant into an unrestrained article of indefinite length which comprises extruding said mixture through a die while subjecting said mixture to vibratory energy having a frequency of between 30 and 300,000 cycles per second and a power level sufficient to produce an extrusion which forms an unrestrained graphite article of indefinite length which is relatively free from both surface and subsurface cracks upon subsequent graphitization, with said vibratory energy power level being sufficient to effect a reduction in the requisite amount of pressure needed to extrude said extrusion mixture through the die.

2. A process in accordance with claim 1 in which the vibratory energy has a power level sufficient to raise the rate of extrusion from that present in the absence of subjecting the mixture to vibratory energy.

3. A process in accordance with claim 1 in which the vibratory energy has a power level sufficient to reduce the extrusion pressure below that otherwise required in the absence of subjecting the mixture to vibratory energy.

References Cited by the Examiner

UNITED STATES PATENTS

| | | | |
|---|---|---|---|
| Re. 18,062 | 5/31 | Doershuk | 264—71 |
| 2,403,301 | 7/46 | Richon | 18—54.7 |
| 2,408,627 | 10/46 | Green | 18—12 |
| 2,434,271 | 1/48 | Howatt. | |
| 2,681,896 | 6/54 | Nielson | 260—41 |
| 2,764,539 | 9/56 | Horvitz | 252—502 XR |
| 2,765,153 | 10/56 | Gielow | 18—12 XR |
| 3,001,237 | 9/61 | Balaguer | 18—54.7 |
| 3,002,614 | 10/61 | Jones. | |
| 3,025,229 | 3/62 | Folkrod | 252—502 XR |

ROBERT F. WHITE, *Primary Examiner.*

MICHAEL V. BRINDISI, ALEXANDER H. BRODMERKEL, *Examiners.*